United States Patent
Barnes et al.

(10) Patent No.: US 7,529,681 B2
(45) Date of Patent: *May 5, 2009

(54) TICKET TRACKING, REMINDING, AND REDEEMING SYSTEM AND METHOD

(75) Inventors: Robert G. Barnes, Scottsdale, AZ (US); Diego Espinosa, Phoenix, AZ (US); Meg Rediess, Boston, MA (US); Lisa Steury, Hoboken, NJ (US); Warren P. Warner, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 624 days.

This patent is subject to a terminal disclaimer.

(21) Appl. No.: 10/294,930

(22) Filed: Nov. 14, 2002

(65) Prior Publication Data

US 2004/0010427 A1    Jan. 15, 2004

Related U.S. Application Data

(63) Continuation-in-part of application No. 09/346,085, filed on Jul. 1, 1999.

(60) Provisional application No. 60/396,224, filed on Jul. 15, 2002.

(51) Int. Cl.
    *G06F 17/06* (2006.01)
(52) U.S. Cl. .................................... 705/1; 705/5; 705/6
(58) Field of Classification Search ...................... 705/1, 705/50, 77, 80
    See application file for complete search history.

(56) References Cited

U.S. PATENT DOCUMENTS 4,720,785 A    1/1988    Shapiro (Continued)

FOREIGN PATENT DOCUMENTS

WO    WO 96/07266    3/1996

(Continued)

OTHER PUBLICATIONS

Melissa Abernathy, American Express Expands RoundTrip Services With Array of New Products and Services, Jul. 15, 1997, Business Wire.*

(Continued)

*Primary Examiner*—John G Weiss
*Assistant Examiner*—Matthew S Meyers
(74) *Attorney, Agent, or Firm*—Fitzpatrick, Cella, Harper & Scinto

(57) ABSTRACT

An automated method and system for facilitating timely use and/or redemption of the unused portion of an electronic ticket are provided. In accordance with the method, an aging period is set and is added to the scheduled departure date of the issued ticket, and a reminder period is set and subtracted from the scheduled date of a ticket. If the scheduled departure date plus the aging date is earlier than the current date, a determination is made as to whether the ticket has been used. If the scheduled date minus the reminder period is earlier than the current date, then a message is communicated to the traveler reminding him to use or redeem the ticket. A residual value of the ticket is calculated and communicated to a client to facilitate redemption of the unused ticket and issuance of appropriate redemption credit.

12 Claims, 5 Drawing Sheets

U.S. PATENT DOCUMENTS

| | | | |
|---|---|---|---|
| 5,023,782 | A | 6/1991 | Lutz et al. |
| 5,237,499 | A | 8/1993 | Garback |
| 5,404,291 | A | 4/1995 | Kerr et al. |
| 5,467,269 | A | 11/1995 | Flaten |
| 5,483,444 | A | 1/1996 | Heintzeman et al. |
| 5,513,102 | A | 4/1996 | Auriemma |
| 5,621,797 | A | 4/1997 | Rosen |
| 5,724,520 | A | 3/1998 | Goheen |
| 5,754,654 | A | 5/1998 | Hiroya et al. |
| 5,781,892 | A | 7/1998 | Hunt et al. |
| 5,797,127 | A | 8/1998 | Walker et al. |
| 5,832,451 | A | 11/1998 | Flake et al. |
| 5,855,006 | A * | 12/1998 | Huemoeller et al. ............ 705/9 |
| 5,878,139 | A | 3/1999 | Rosen |
| 6,009,401 | A | 12/1999 | Horstmann |
| 6,086,477 | A | 7/2000 | Walker et al. |
| 6,094,640 | A | 7/2000 | Goheen |
| 6,101,477 | A | 8/2000 | Hohle et al. |
| 6,107,932 | A | 8/2000 | Walker et al. |
| 6,134,534 | A | 10/2000 | Walker et al. |
| 6,175,922 | B1 | 1/2001 | Wang |
| 6,241,606 | B1 | 6/2001 | Riendeau et al. |
| 6,307,572 | B1 | 10/2001 | DeMarcken et al. |
| 6,308,159 | B1 | 10/2001 | Strohl |
| 6,336,095 | B1 | 1/2002 | Rosen |
| 6,338,041 | B1 | 1/2002 | Kawamata |
| 6,442,526 | B1 | 8/2002 | Vance et al. |
| 6,599,186 | B1 | 7/2003 | Walker et al. |
| 6,601,046 | B1 | 7/2003 | Epstein |
| 6,658,390 | B1 | 12/2003 | Walker et al. |
| 7,050,986 | B1 * | 5/2006 | Vance et al. .................... 705/5 |
| 2001/0016825 | A1 | 8/2001 | Pugliese, III et al. |
| 2002/0007327 | A1 | 1/2002 | Steury et al. |
| 2002/0016723 | A1 | 2/2002 | Matsui et al. |
| 2002/0019807 | A1 | 2/2002 | Halpern |
| 2002/0023017 | A1 | 2/2002 | Hidaka et al. |
| 2002/0026405 | A1 | 2/2002 | Haar |
| 2002/0026416 | A1 | 2/2002 | Provinse |
| 2002/0049658 | A1 | 4/2002 | Davidson et al. |
| 2002/0069118 | A1 | 6/2002 | Zylstra |
| 2002/0103849 | A1 | 8/2002 | Smith |
| 2002/0138325 | A1 | 9/2002 | Mashimo et al. |
| 2002/0139843 | A1 | 10/2002 | Park et al. |
| 2002/0156715 | A1 | 10/2002 | Wall et al. |
| 2003/0154387 | A1 * | 8/2003 | Evans et al. .................. 713/193 |
| 2003/0177022 | A1 | 9/2003 | Francis |
| 2003/0216973 | A1 | 11/2003 | Walker et al. |

FOREIGN PATENT DOCUMENTS

WO      WO 01/02980 A2     1/2001

OTHER PUBLICATIONS

T & E Managers' Forum, Managing T & E, Oct. 1999.*
Future mix of Western fuels leans to gas Megawatt Daily Sep. 25, 1998.*
M2 Presswire article, entitled "American Express Ticket TRAX service launches for American Express business travel clients" dated Mar. 12, 1999.*
"A Smarter Way to Fly", published in ECompany Now, May 2000.
"Forgotten Tickets, Railroad Policy Survives", published in New York Times, Dec. 19, 1997.
"Why Do I Have to Wait a Year to Get a Refund on My Airline Tickets?", published in Money Magazine, May 1997.
"Firm's New System Tracks, Refunds Unused E-Tickets", published in Travel Weekly, May 24, 1999; p. 24.
"American Express Expands Automated Tracking and Refunding of Unused Electronic Air Tickets Globally", American Express News Release, Aug. 11, 2003.
Sharkey, Joe, "On The Road; A Business Changed, Perhaps Permanently", The New York Times, Jul. 16, 2002.

* cited by examiner

TICKET TRACKING, REMINDING, AND REDEEMING SYSTEM AND METHOD

CROSS REFERENCE TO RELATED APPLICATIONS

This application claims benefit from U.S. Nonprovisional patent application Ser. No. 09/346,085, filed Jul. 1, 1999 and U.S. Provisional Patent Application Ser. No. 60/396,224, filed Jul. 15, 2002, both of which are hereby incorporated by reference.

FIELD OF THE INVENTION

This invention relates generally to a method and system for tracking tickets, and more specifically to a method and system for tracking electronic tickets and for facilitating timely use of such tickets and/or recapture of value through redemption of unused tickets.

BACKGROUND OF THE INVENTION

The number of tickets being issued for services (such as airline and other forms of travel as well as hotel accommodations, concerts, seminars, shows, park admissions, events and the like) is rapidly increasing. It is especially true that the number of electronic tickets, and specifically electronic tickets for airline travel, is increasing very rapidly. Many travelers, and especially frequent business travelers, find themselves in the position of scheduling many trips, changing itineraries, canceling or rescheduling trips, and otherwise creating a complex history of travel scheduling and rescheduling. It is not unusual in the midst of this hectic travel history to forget, or lose track, unused tickets. The problem of forgetting to timely use such tickets and/or forgetting to redeem unused tickets is exacerbated by the growing use of electronic tickets, since, with the electronic ticket, the traveler may have no paper record to remind him or her when to use a ticket or even that a ticket ever existed.

Unfortunately, unused and forgotten tickets expire after some prescribed period of time. If forgotten and unclaimed after expiration, the money paid for the ticket is usually kept by the airline or other service provider, and no benefit is ever realized by the purchaser. If a number of unused but paid for tickets expire and are not refunded or redeemed, a frequent traveler or a business that employs one or more travelers can sustain a significant financial loss and/or fail to capitalize on valuable opportunity.

If the tickets are able, some of this loss may be recovered by tracking unused tickets and seeking refunds. But such refunds typically must be sought in a timely manner. For example, full or partial refunds may be available prior to a specific date, but may be severely limited after such date. Even if the tickets are not refundable, they may nevertheless be redeemable for some form of value. In such cases, the loss may be mitigated through redemption of the unused tickets. The importance of this latter situation is becoming increasingly important because, while the use of electronic tickets is growing, so is the use of non-refundable tickets. This trend is due in large part to the significant cost savings associated with non-refundable tickets, which is causing their increased use by business travelers. Unfortunately, to recapture value from an unused, non-refundable ticket usually requires a cumbersome alternative to a refund such as an exchange, a credit, a discount, or some other mechanism for redeeming the ticket to capture its residual value. In addition, the window during which value may be captured from an unused ticket typically does not remain open indefinitely, and the value that may be recaptured tends to decrease with the passage of time. Accordingly, although it is typically preferable to use a ticket as scheduled, the next best option is typically to redeem an unused ticket as soon as possible, preferably before the scheduled date of the ticket.

In the past there has been no efficient way to track pending and/or unused tickets and to facilitate their use and/or their redemption for value on behalf of the traveler or the traveler's employer. Any systems that have been available have been substantially manual systems that are unreliable and have little ability to track current or past activity or to report on tickets that need to be used, that were actually redeemed, or that were not redeemed. Accordingly, a need existed for an automated system for identifying soon to expire tickets and unused tickets that have not been redeemed for value, for determining what form of redemption may be used, and for communicating, to the appropriate party such as the ticket holder, appropriate information to facilitate use of the tickets or the issuance of redemption credit or exchange.

SUMMARY OF THE INVENTION

In accordance with one embodiment of the invention, a management service and method for facilitating use of electronic tickets and automated redemption of unused, electronic tickets are provided. The traveler or the traveler's employer sets an aging period beyond which tickets are deemed to be unused. The aging period is added to the final scheduled date of the issued ticket, and if the resultant date is earlier than the current date, a determination is made as to whether the ticket has been used or not. If the ticket has not been used, a further determination may be made as to what mechanisms are available for capturing value based on the unused ticket, e.g., whether the ticket is refundable, and/or whether the ticket may otherwise be redeemed for value. If the ticket has not been used and is redeemable, the residual value of the ticket is calculated and information is communicated to an appropriate party such as a client, a central reservation system, a global distribution system, and/or a point of sale office.

The traveler or traveler's employer may also set a reminder period prior to scheduled use of a ticket, within which time period a message may be scheduled to be dispatched to the traveler, or a designated agent of the traveler, for reminding the traveler to use or redeem the ticket. The reminder period is subtracted from the scheduled date of the ticket, and if the resultant date is earlier than the current date, an automated message is sent via e-mail, telephone, or the like, to remind the traveler to use or redeem the ticket. In an exemplary embodiment, the system may be configured to determine redemption methods and/or values available to the traveler or the traveler's employer, depending on the scheduled date of the ticket, the current date, and the rules associated with the particular ticket.

In one embodiment, a preliminary determination is made as to whether the residual value meets or exceeds a benchmark value. If the residual value meets or exceeds the benchmark value, a refund may be issued or a redemption offer may be presented. If the offer is accepted, a refund or redemption credit may be issued. Accordingly, the system facilitates redemption of the ticket on behalf of the traveler or the purchaser of the ticket. The traveler is then notified and the database containing information about issued tickets is updated to reflect the fact that the electronic ticket has been closed. As a residual value is compared to the benchmark value, the system may be configured to track the quantity of tickets that meet, or do not meet, the appropriate criteria, and those quantities may be communicated to the client. In situations where it is difficult or impossible to reliably determine the residual value of an unused ticket, the system may communicate with a customer service tool to acquire an appropriate redemption value.

DETAILED DESCRIPTION OF PREFERRED EMBODIMENTS

Figure 1:
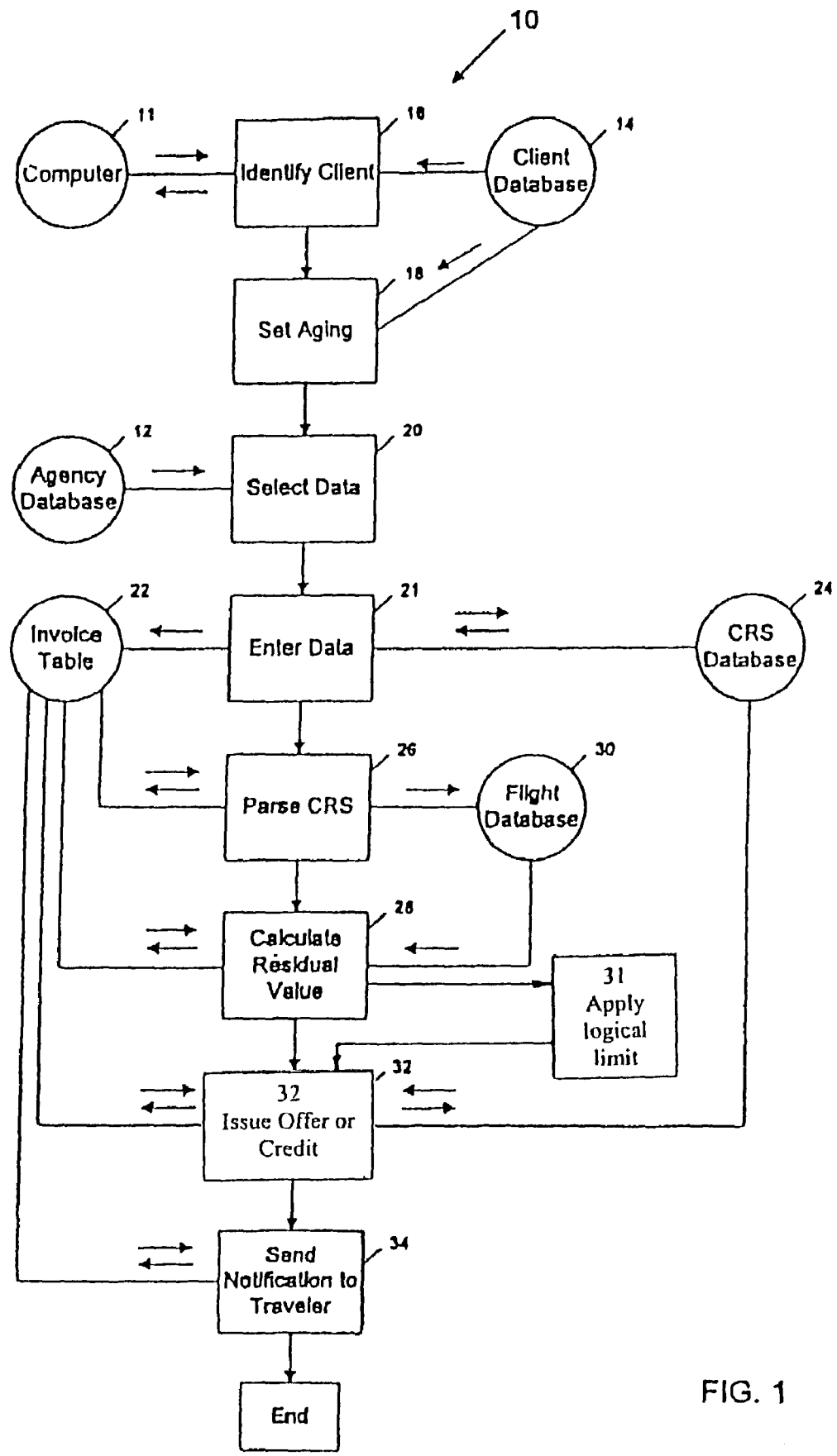
FIG. 1 is a flow chart illustrating a method and system in accordance with the invention for facilitating redemption of unused tickets.

FIG. 1 is a flow chart illustrating, at a high level, one embodiment of the ticket tracking and redeeming system and method 10 in accordance with the invention. In describing the invention, reference will be made to a system and method for facilitating timely use of electronic tickets and/or redemption of unused electronic tickets, but the invention is not limited to these illustrative embodiments. The reminder and redemption system and method are applicable to other types of airline tickets, other types of travel, and to other ticketed endeavors. Further, the invention is illustrated with reference to services provided by a travel agency to a plurality of its clients. The clients can be individual travelers or businesses having employees that are frequent travelers. The invention, however, is not limited to such a travel agency or such a client. Further, wherever this description refers to the communication of information to a client, it is contemplated that the recipient of the information may be a ticket reservation system, a point of sale office, a global distribution system, the ticket holder, a party financially related to the ticket holder, or any other client of the system.

In an exemplary embodiment, the system may be configured as a data processing system that includes a processor for processing digital data, one or more memory coupled to the processor for storing digital data, and means, coupled to the one or more memory, for inputting digital data. In one embodiment, a redemption manager may be configured as an application program, may be stored in the memory, and may be accessible by the processor for directing processing of digital data by the processor.

In accordance with a preferred embodiment, the system includes a database 12 which includes all travel related activities scheduled and ticketed by the travel agency. In addition, a second database 14 includes a listing of all clients that subscribe to the redemption management system. The two databases 12, 14 can, of course, be combined as a single database including all of the information contained in the two separate databases.

The system may include a host server or other computing systems including a processor for processing digital data, a memory coupled to the processor for storing digital data, an input digitizer coupled to the processor for inputting digital data, an application program, such as the redemption manager described above, stored in the memory and accessible by the processor for directing processing of digital data by the processor, a display coupled to the processor and memory for displaying information derived from digital data processed by the processor and a plurality of databases, that may include client data, ticket data, event data and/or like data that could be used in association with the present invention. As those skilled in the art will appreciate, each computer will typically include an operating system (e.g., Windows NT, 95/98/2000, Linux, Solaris, etc.) as well as various conventional support software and drivers typically associated with computers. The computers can be in a home or business environment with access to a network. In an exemplary embodiment, access may be had through the Internet through a commercially-available web-browser software package.

Each participant may be equipped with a computing system to facilitate online commerce transactions. The client has a computing unit in the form of a personal computer, although other types of computing units may be used including laptops, notebooks, hand held computers, set-top boxes, and the like. The point of sale office has a computing unit implemented in the form of a computer-server, although other implementations are possible. The central reservation center has a computing center in the form of a main frame computer. However, the central reservation center may be implemented in other forms, such as a mini-computer, a PC server, a network set of computers, and the like.

Communication between the parties to the ticket redemption transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The presentation of a reminders to use or redeem a ticket or of certain redemption offers and the conduct of some redemption transactions may necessitate communication between the various institutions such as travel agencies, financial institutions, and service providers. The computers of the various parties may be interconnected via a second network, referred to as a redemption network. The redemption network represents existing proprietary networks that presently accommodate electronic transactions. The redemption network may be a closed network that is assumed to be secure from eavesdroppers. Examples of the redemption network include the American Express®, VisaNet® and the Veriphone® network.

The computing units may be connected with each other via a data communication network that may be a public network and that may be assumed to be insecure and open to eavesdroppers. In an exemplary embodiment, the network may be embodied as the Internet. In this context, the computers may or may not be connected to the internet at all times. For instance, a client or point of sale computer may employ a modem to occasionally connect to the internet, whereas the redemption manager computing center or the global reservation system computer might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Client systems might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

The redemption system and its functional elements may be implemented and distributed among the various parties. In an exemplary implementation, the redemption network may be implemented as computer software modules loaded onto the various computer systems of some of the parties, e.g., the point of sale office and the central reservation center, so that the computers of the other parties. e.g., the clients, do not require any additional software to participate in the redemption transactions supported by the redemption system.

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The redemption process starts, at step 16, by identifying a client that has subscribed to the redemption management system. The client is identified by accessing the data in database 14. The step of identifying a client is carried out by computer 11 using a standard software search routine. In this and other steps in accordance with the invention, a computer 11 is identified as the operative instrument for carrying out the step. In accordance with a preferred embodiment of the invention, all steps in the process are carried out on a centralized computer that has access to all of the relevant data bases. Alternatively, the functions carried out by computer 11 can be carried out by a plurality of local computers, preferably localized computers that are linked together. The client next determines an aging criteria at step 18. The aging criteria, for example, may be a period of time ranging from positive or negative zero to three hundred and sixty five days. The aging criteria is set by the client and establishes a criteria for determining how old a ticket must be before it is assumed that ticket will not be used. A negative aging period may be used to schedule a reminder notice regarding the use or redemption of a ticket prior to the scheduled date of the ticket. Usually the aging criteria is set at between about fifteen days and about sixty days. The aging criteria set by a client can be stored in client database 14.

In step 20 all data from database 12 is selected that relates to the particular client and to tickets for which the final departure date on the ticket precedes or exceeds the current date by a period of time greater than the aging period selected by the client. For example, if the client has selected an aging period of thirty days, all tickets issued to the client having a final scheduled departure date more than thirty days prior to the current date are selected. For convenience, such tickets will hereinafter be referred to as "aged tickets." An advantage of the process in accordance with the invention is that when a client subscribes to the redemption process, the process can be applied to all ticket activity carried out by that client with the travel agency for some period of time prior to subscribing. For example, the process can be applied to all activity by that client during any of the previous time period for which the agency retains such records without manual support from the agency. Reference above is made to the "final" departure date because tickets may include several departure dates. For example, a ticket may include a departure date for each of the various segments of a trip.

At step 21 the information concerning the aged tickets is entered into an invoice table 22 which keeps all data on such aged tickets and, as will be explained later, on unused tickets. The redemption system in accordance with the invention also uses data stored in one of the central reservation system (CRS) databases 24. There are several central reservation system databases available. These databases are maintained by the airline industry and are accessible by any travel agent. Database 24 includes information on all issued tickets. Whenever a ticket is issued for any flight, that information is stored in the central reservation system database. It is important that much of this same information is also stored in agency database 12 because the airlines delete records, usually within seven days, following the date the ticket is used, or when the ticket passes an expiration date. For most airlines the expiration date is thirteen months after the ticket date; for some airlines it is twenty four months after the ticket date. The process described herein can be applied to any tickets that have not passed the expiration date as long as the relevant information is stored in the agency database 12. That is, the process in accordance with the invention can be applied to any ticket issued in the last thirteen months (or twenty four months with some airlines). Without having the relevant information in the agency database, if no record for a particular ticket was found in the CRS database, it would not be possible to determine whether that ticket had been used or whether it had passed its expiration date.

The redemption process continues with step 26, in which the central reservation system database 24 is parsed. Step 26 will be explained in more detail below, but, in summary, step 26 includes using the information from the central reservation system and from the invoice table to determine whether a particular ticket has been used or not, and if the ticket is an unused, aged ticket, to determine whether the ticket is redeemable or not, and to determine the residual value of that ticket.

The redemption process continues with step 28 in which the residual value of an unused and aged ticket is calculated. Step 28 will be explained in more detail below, but, in summary, includes using the information parsed from the central reservation system database, the invoice table 22, and additionally information stored in yet another database, flight database 30. Flight database 30 holds information on particular flights, including the flight number, cost of the ticket, departure city and arrival city, departure date, and any information on whether and to what extent the ticket is redeemable. If redeemable, the amount of redemption credit, i.e., exchangeable value, is calculated as being the residual value of the ticket less any fees, penalties, and the like that assessed to the ticket holder such as fees for changing an itinerary or for facilitating redemption of the ticket.

The next step in the process, in accordance with the invention, step 32, is to issue, or offer to issue, redemption credit to the client. Again, this step will be explained in more detail below. In summary, the step of issuing, or offering to issue, redemption credit, besides issuing a credit to the client, includes updating the central reservation system database 24, or whatever other database the client desires, the client's point of sale office, if desired, and the invoice table.

In accordance with one embodiment of the invention, the redemption process 10 concludes with the step of sending notification of the redemption credit to the traveler, step 34. As mentioned above, in connection with the issuance of the redemption credit, one or more offers may be presented to the client whereby an alternative ticket, a discounted alternative ticket, or another form of value may be offered to be provided in exchange for, or in lieu of, the redemption credit.

In an alternative embodiment, as mentioned above in conjunction with the setting of the aging period, a reminder period may be prescribed and/or calculated to establish time-based criteria according to which a reminder message may be sent to the traveler or the traveler's agent reminding the traveler to timely use or redeem the ticket, step 31. In accordance with this embodiment, the reminder period is subtracted from the scheduled date of the ticket to determine a reminder date. If the current date is greater than the reminder date, a reminder message may be sent to the traveler or the traveler's agent reminding the traveler to use or redeem the ticket. In addition to the reminder, various methods of redeeming the ticket may be determined based on the associated timing and the various rules that may be associated with the ticket. For example, full refunds may be available only up to a certain date such as the scheduled date of the ticket. In such cases, an additional reminder may be sent to the traveler indicating such information. Other criteria may include a diminishing redemption value as a function of time. Additional reminders may be configured to convey such information and to be scheduled in accordance with such information.

In an exemplary embodiment, logical limits may also be implemented such that the presentation of information and/or the issuance of redemption credit may be made to depend upon the relationship between the amount of available redemption credit and the predetermined limit. In accordance with this embodiment, a client may designate one or more limiting values, which may be associated with a logical definition of how the limiting value is to be applied. For example, a client may specify a benchmark value to be used to prevent or discard redemption offers that do not satisfy (e.g., meet or exceed) the benchmark criteria (e.g., by setting the benchmark at $200 and defining the benchmark so as to cause it to be treated as a logical minimum, a client may avoid receiving offers for redemption credit in quantities lower than $200). The benchmark value may therefore be chosen so as to limit the quantity and/or magnitude of offers to be presented to a client. This feature may be useful, for example, wherever a client desires to receive only offers where the value to be captured exceeds the costs of conducting the redemption transaction. In another exemplary embodiment, a client may specify a benchmark and define it as a logical minimum level above which redemption offers must be presented to an alternative party or must be handled in an alternative manner. Accordingly, once the amount of redemption credit has been determined, the system may determine whether that amount satisfies the predetermined benchmark criteria. Further, the system may be configured to track the quantity of tickets having redemption values that satisfy, or fail to satisfy, the benchmark criteria and to report such information to a designated party such as the client or another interested party.

Where the determination of residual value or redemption credit is difficult or impossible to automatically determine, the system may be configured to transmit appropriate information to a customer service tool. The customer service tool may then be used to facilitate determination of residual value through an alternative method such as manual input. Then, the customer service tool may transmit that value to the system.

Figure 2:
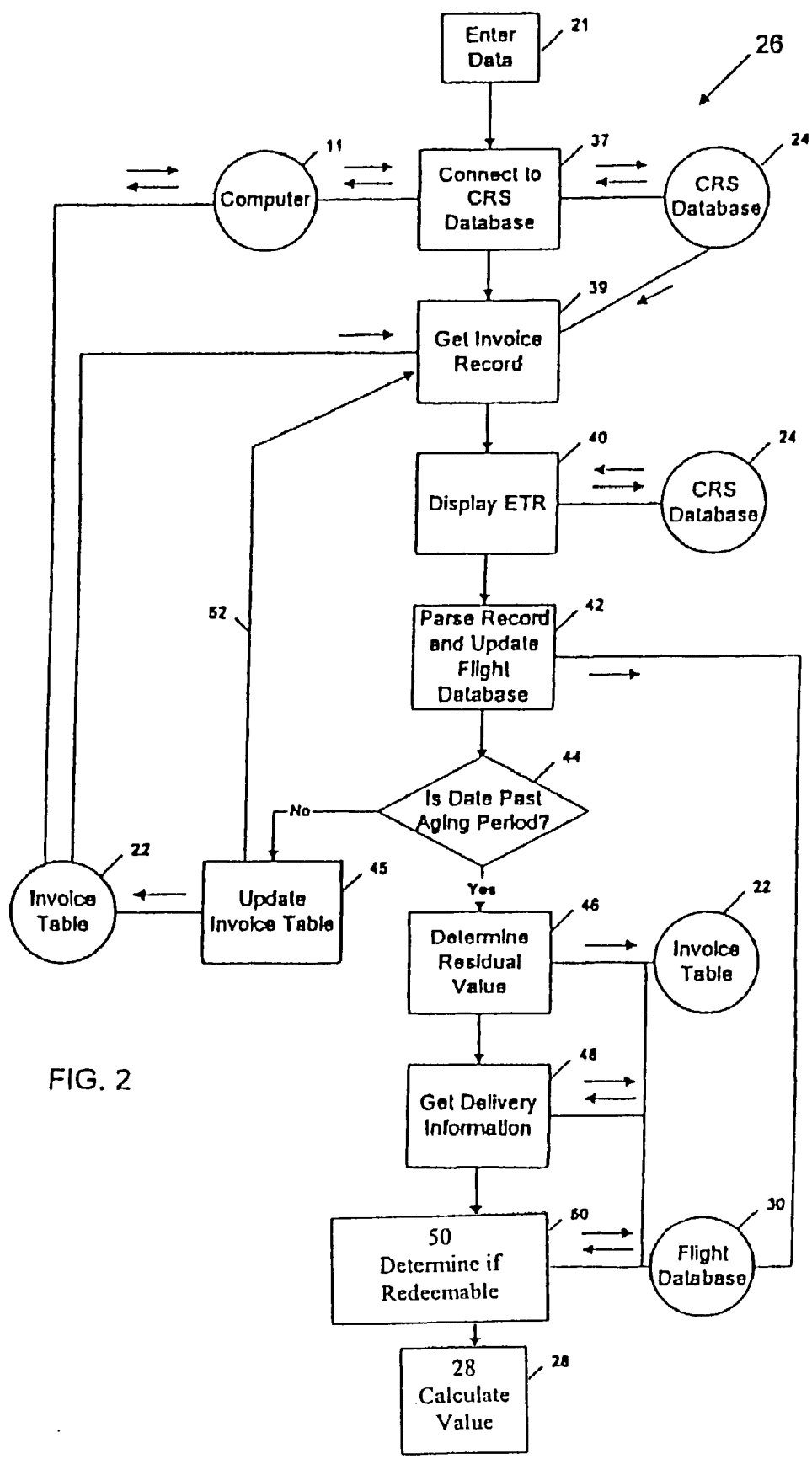
FIGS. 2-5 are flow charts illustrating, in more detail, particular embodiments of the process illustrated in FIG. 1.

FIGS. 2-5 illustrate, in flow chart form, aspects of various embodiments of the invention in greater detail. FIG. 2 illustrates in more detail, for example, step 26 of parsing the central reservation database. As explained above, the redemption method in accordance with the invention is practiced by implementing various process steps on a computer 11. Computer 11 is preferably a centralized computer controlling and/or interfacing with each of the various databases, but alternatively can be a plurality of individual personal computers or the like. Throughout the illustrative figures, computer 11 will be illustrated as a single centralized computer. As such, computer 11 performs the various method steps by appropriately interfacing with the databases that comprise the total system.

Step 26 of the redemption method starts by connecting computer 11 to the central reservation system database 24, step 37. Similarly, computer 11 connects to invoice table 22 and retrieves information from the table, step 39, concerning a particular passenger and a particular invoice for a ticket judged to be an aged ticket. The invoice may include multiple flights or multiple flight segments for that particular passenger. Information is also retrieved from central reservation system database 24 concerning each of those flights and flight segments to determine which portion of the invoice has been used.

In step 40 the electronic ticket record (ETR) is viewed and a determination is made by software resident in computer 11 as to what ticket segments were used, what fare was paid for those ticket segments, and whether the ticket is redeemable or not. The information necessary for carrying out step 40 is found in the central reservation system data base 24.

In step 42 the information retrieved in step 40 is parsed and flight database 30 is updated to reflect the information retrieved from the central reservation system database. As part of step 42 a determination is made as to the last open segment of any of the scheduled flights that were ticketed. This reflects the fact that a portion of the ticket may have been used while other segments were not used. In addition, the traveler may have revised the ticket to change the scheduled time. That information would be found in the central reservation system database, but might not be reflected in the invoice table or flight database. Flight database 30 is updated with the revised open segment information.

In step 44 the updated information on the date of the last open segment is compared to the current date to determine whether that date has exceeded the aging period. If not, for example because the traveler has revised the scheduled departure dates, the invoice table is updated with the revised last scheduled open segment date, step 45, and the process is terminated with respect to that particular traveler or invoice. Upon such termination, the process returns to step 39 and retrieves another invoice record. If the last open segment departure date is past the aging period, the residual value of the ticket or ticket segment is determined at step 46. This information is used to update both the flight database and the invoice table. In accordance with one embodiment of the invention, the next step in the process, step 48, is to retrieve delivery information. This information, includes, for example, the address and/or fax number for the scheduled traveler. This information is retrieved from the ticketing database 12 (not illustrated in this figure), invoice table 22, or flight database 30. In step 50 a determination is made as to whether the ticket or ticket segment is redeemable. This determination is a compilation of information stored in the flight database concerning the original nature of the ticket plus information from the central reservation system database concerning whether the ticket was used or not. The information so determined is used to update both the flight database 30 and the invoice table 22. Following the updating of invoice table 22, either after step 50 or after step 45, the process continues with the step of calculating the residual value, step 28. Optionally, the process also continues by path 52, by returning to step 39 and repeating the process for an additional invoice record for the same client.

Figure 3:
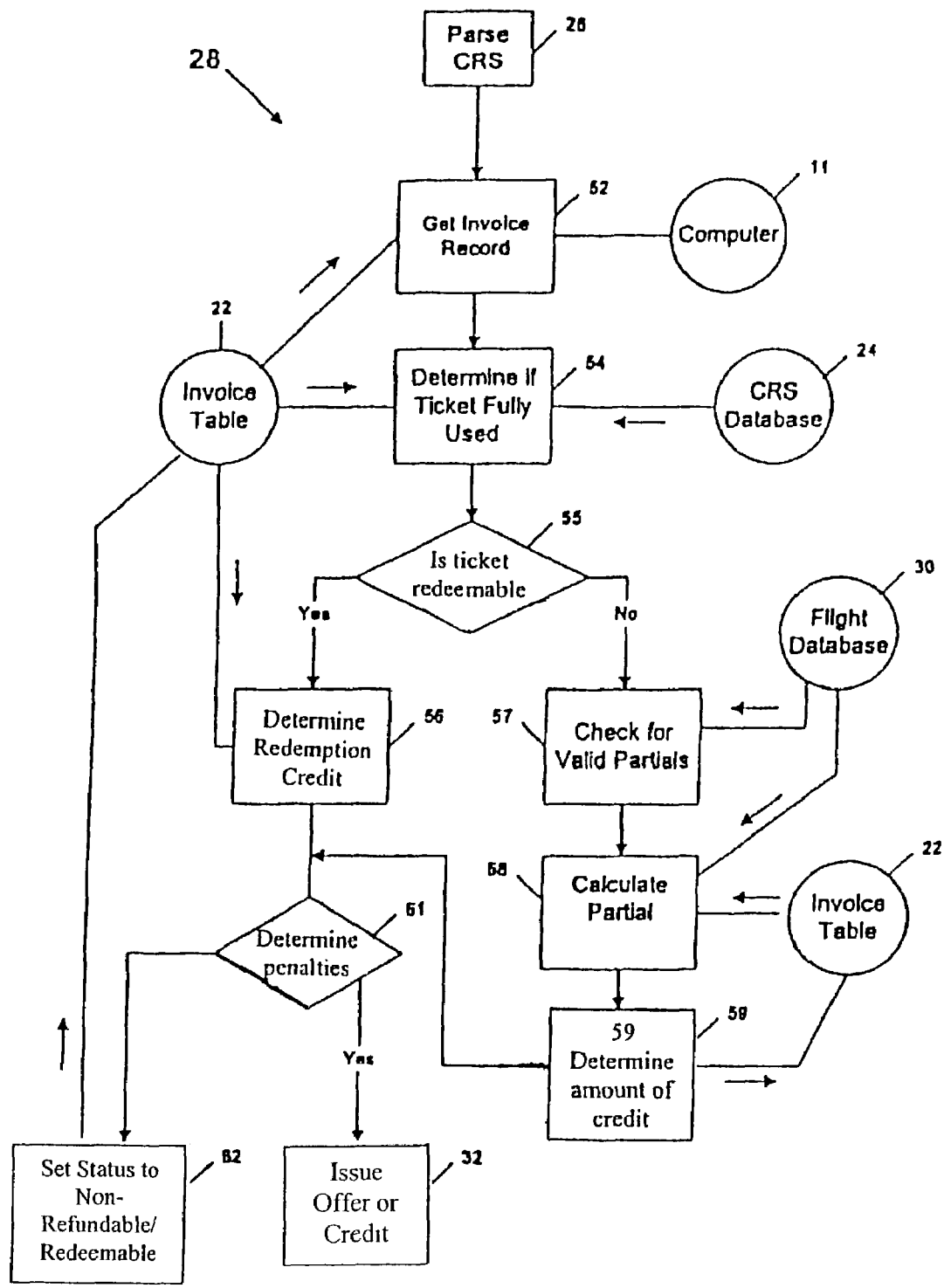

FIG. 3 illustrates, in more detail, aspects of various embodiments of method step 28, calculating the residual value. The step of calculating the residual value starts by retrieving information from the invoice table 22, step 52. Again, the method steps illustrated in FIG. 3 are carried out by computer 11 which can be either a centralized computer or a plurality of distributed computers. Based on the information in the invoice table and in the central reservation system database 24, a determination is made at step 54 of whether the ticket or ticket segment has been fully used. Based on the determination of whether the ticket has been fully used or not, a further determination is made at step 55 as to whether, and to what extent and under what conditions, the ticket is refundable or redeemable for value. Depending on the contract terms entered into when the ticket was issued, some tickets may not be refundable or redeemable if any portion of the ticket has been used. Further contract terms may apply if part of the ticket has been used. If the ticket is at least partially refundable, a refund may be issued. If the ticket is fully redeemable, the amount of redemption credit is determined to be, in accordance with step 56, the residual value calculated in step 46. If the ticket or ticket segment is not fully redeemable, a determination is first made at step 57 as to whether the remaining portion of the ticket is a valid partial. That is, a determination is made as to whether the partial ticket is redeemable if some other portion of the ticket has been used. This determination is made based on information stored in the flight database 30. If the remaining portion is determined to be a valid portion, the amount of partial redemption credit is calculated in step 58. The amount calculated in step 58 is dependent on information retrieved from the flight database 30 and invoice table 22. Flight database 30 includes information concerning fees and penalties that may be assessed in the event a ticket is changed, canceled, partially used, or not used at all. This information is used in calculating the amount of the partial redemption credit. The amount of redemption credit, step 59, is determined to be the amount so calculated. The amount determined in steps 58 and 59 is used to update invoice table 22. After determining the amount of redemption credit in either step 56 or step 59, a final determination is made at step 61 as to whether there are any additional penalties, fees or other considerations to affect the amount of redemption credit. If the ticket is determined to be non-redeemable, at step 61 the status of the ticket is set to non-redeemable in the invoice table and the process is terminated with respect to this record. If the ticket is determined at step 61 to be redeemable, the process continues to step 32 and information is communicated to designated parties so that a redemption offer may be presented and redemption may be facilitated.

Figure 4:
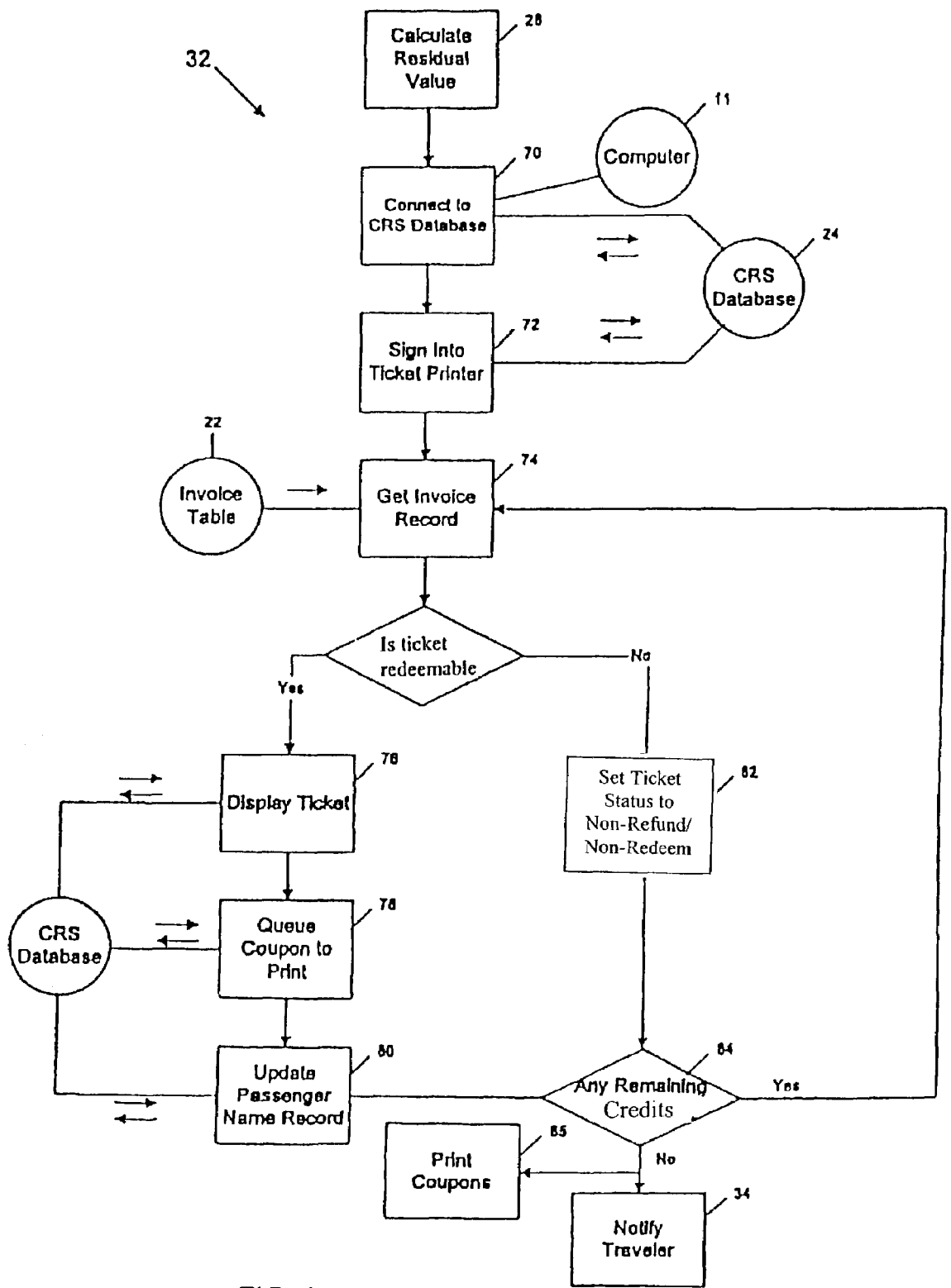

FIG. 4 illustrates, in accordance with various embodiments of the invention, facilitating redemption step 32 in more detail. Following the completion of step 28, computer 11 again connects to the central reservation system database in step 70. The step of facilitating redemption is closely connected to central reservation system database 24 because, in general, the process of facilitating redemption requires an involved process in which the electronic ticket is returned to the airline. As part of a checks and balances system, a coupon is printed indicating the return of the ticket; at a later time the returned-ticket coupon can be matched up with the airline records of the ticket for which redemption credit was granted. In accordance with an embodiment of the invention, computer 11 signs into a ticket printer in step 72. Again, this is done interactively with the central reservation system database. Computer 11 then retrieves the record of the transaction from the invoice table at step 74. If the ticket in question is redeemable and has not been used, that information is conveyed to database 24 at step 76. A coupon is then queued to print at step 78. Printing occurs at the end of the process for a particular traveler, as described below. Following the queuing of the coupon, the passenger name record for the particular ticketed passenger is updated, step 80, in database 24. Again, steps 76, 78, and 80 are all interactive with a central reservation database. If computer 11 determines from the invoice table that the ticket in question is not redeemable, the ticket status for this transaction is set to show that the ticket is non-redeemable in step 82. The invoice table is updated to reflect this status. In step 84 computer 11 determines, at the completion of either step 80 or step 82 whether any redemption credit remains for this passenger name record. If there are additional redemption credit issues remaining for this passenger name record, the process returns to step 74 and the next invoice record for this client is processed. If there are no further redemption credits to be processed for this passenger name record, the coupons in the queue are printed, step 85, and the process continues, in accordance with one embodiment, with step 34.

Figure 5:
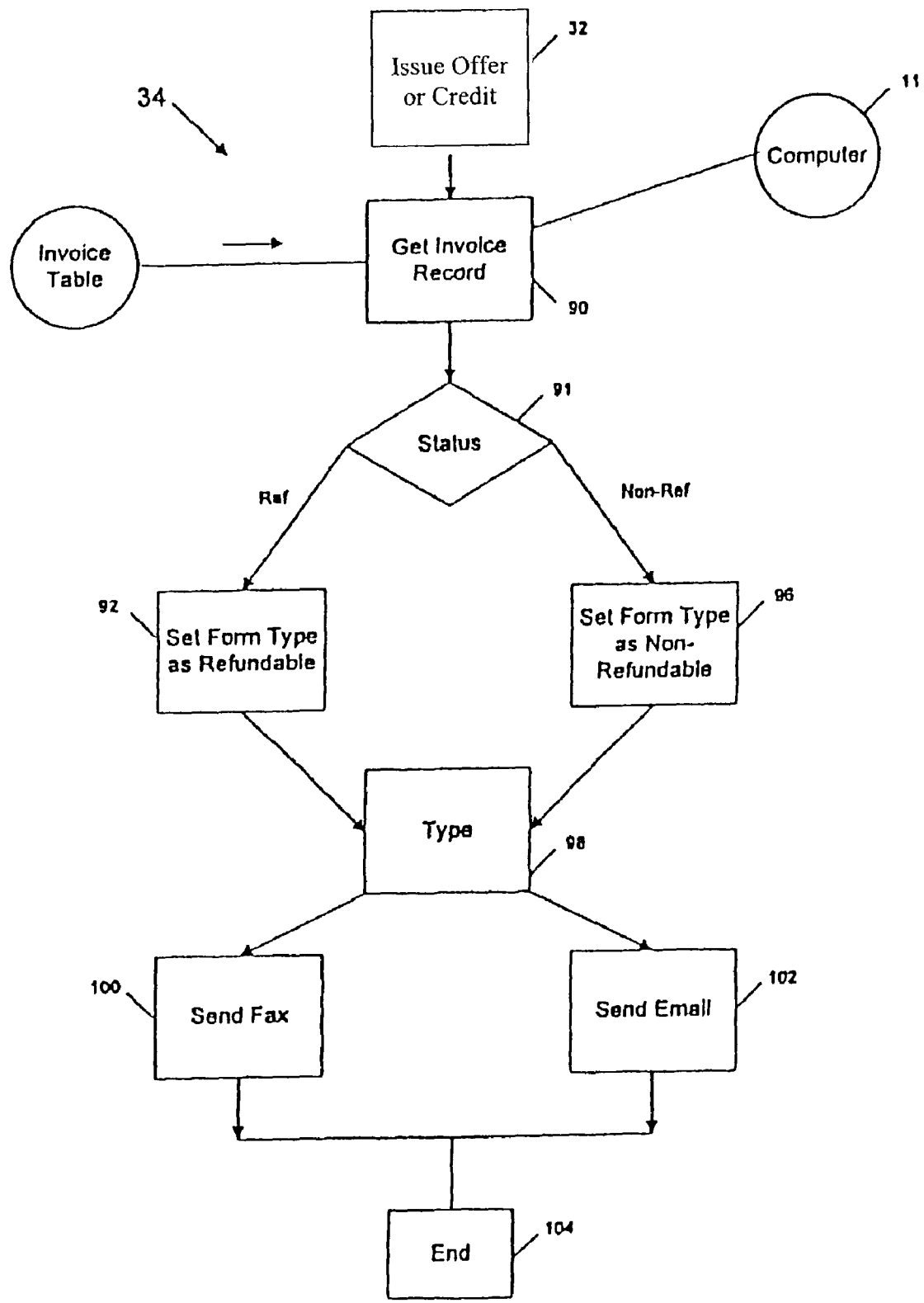

In accordance with one embodiment of the invention, as illustrated in FIG. 5, following the step of issuing redemption credit, step 32, notification is sent to the passenger in step 34.

Computer 11 again interfaces with invoice table 22 to retrieve the record of this transaction and to get the delivery information generated in step 48. This is done in step 90. Based on the record retrieved in step 90, computer 11 makes a determination, in step 91, as to the status of this transaction, either redeemable or non-redeemable. If the status is determined to be redeemable, a form is selected in step 92 for a redeemable transaction. If the transaction is determined to be non-redeemable, a form is selected in step 96 for a non-redeemable transaction. The form selected in either step 92 or 96 is typed in step 98 and then is sent by facsimile in step 100 to the ticketed traveler or sent by e-mail to the ticketed traveler in step 102. Upon notification of the traveler, the process is completed, at step 104, for this traveler. The process can now be repeated for other travelers or for other clients.

Thus it is apparent that there has been provided, in accordance with the invention, a redemption credit system and method that fully meet the needs specified above. Although the system and method have been described and illustrated with reference to specific illustrative embodiments, it is not intended that the invention be limited to these illustrative embodiments. Those skilled in the art will recognize that many variations and modifications to these illustrative embodiments are possible without departing from the spirit and scope of the appended claims. For example, as noted above, the databases that have been referred to can be individual databases, a single central database, or databases partitioned in ways other than as illustrated in the figures. Preferably the invention is practiced through use of a single central computer which can contain all transactions for a particular client, regardless of location of that client or various departments, divisions or other segments of that client. Additionally, the invention has been illustrated with reference to particular practices presently in use by the airline industry. Those of skill in the art will recognize that the airline industry periodically changes its practices, procedures, and requirements, and the invention is not to be limited to any one particular set of airline requirements. Further, although illustrated with reference to electronic tickets used in the airline industry, the invention is applicable to other forms of ticketing in the airline industry, in other modes of transportation, and other ticketed activities.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention may be described herein in terms of functional block components, screen shots, optional selections, various processing steps, block diagrams and flowchart illustrations of methods, apparatus (e.g., systems), and computer program products according to various aspects of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. It will further be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process descriptions may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A computer-implemented method for facilitating automated redemption of an unused electronic ticket, comprising the steps of:
   setting, via a computer system, an aging period;
   identifying, via a computer system, a scheduled date of an issued ticket;
   adding, via a computer system, the aging period to the scheduled date and, if the scheduled date plus the aging period is earlier than a current date, determining, via a computer system, whether all or a portion of the issued ticket is unused; and
   if all or a portion of the issued ticket has not been used,
      comparing, via a computer system, information in an invoice table and a central reservation system database to determine at least one of a use of the issued ticket and a change to the issued ticket, the comparing forming comparison data;
      calculating, via a computer system, a residual value of the ticket based on a contract term associated with the ticket and any changes to the issued ticket or partial use of the issued ticket as indicated by the comparison data;
      determining, via a computer system, an offer to redeem the issued ticket based on the residual value and a contract term associated with the ticket, the offer not including a refund; and
      presenting, via a computer system, the offer to redeem the issued ticket.

2. The method of claim 1, further comprising the step of setting a benchmark value, wherein said step of presenting is performed only if the residual value of the ticket is not less than the benchmark value.

3. The method of claim 1, further comprising the steps of setting a benchmark value and determining, via a computer system, a quantity representing a number of tickets having a residual value that is less than the benchmark value.

4. The method of claim 3, further comprising the step of notifying the client of the quantity.

5. The method of claim 1, wherein the electronic ticket comprises a plurality of data fields and wherein said step of calculating, comprises the steps of communicating the data fields to a customer service tool and receiving a redemption value from the customer service tool.

6. The method of claim 1, wherein the client is a ticket reservation system.

7. The method of claim 1, wherein the client is a point of sale office.

8. The method of claim 1, wherein the client is a global distribution system.

9. A system for redeeming an unused electronic ticket, comprising:
   a first database containing information on activities scheduled and ticketed;
   a second database containing information on tickets issued for the activities;
   a third database containing information on selected ones of the tickets for activities having a schedule date more than a predetermined period of time prior to a current date;
   means for determining from the information in said second database whether all or a portion of each of the selected ones of the tickets are unused;
   means for comparing information in an invoice table and a central reservation system database to determine at least one of a use of each of the selected ones of the tickets and a change to each of the selected ones of the tickets, the comparing forming comparison data;
   means for calculating a residual value of each of the selected ones of the tickets based on a contract term associated with each of the selected ones of the tickets, and any changes to each of the selected ones of the tickets or partial use of each of the selected ones of the tickets, respectively, as indicated by the comparison data;

means for determining offers to redeem each of the selected ones of the tickets based on the residual value of each of the selected ones of the tickets and a contract term associated with each of the selected ones of the tickets, respectively, the offers not including a refund; and means for redeeming the offers.

10. A computer-implemented method for facilitating timely use of an electronic ticket, comprising the steps of:

setting, via a computer system, a reminder period;

identifying, via a computer system, a scheduled date of an issued ticket; and subtracting, via computer a system, a reminder period from the scheduled date and, if the scheduled date minus the reminder period is earlier than a current date, determining, via a computer system, whether all or a portion of the issued ticket is unused; and if all or a portion of the issued ticket has not been used, comparing, via a computer system, information in an invoice table and a central reservation system database to determine at least one of a use of the issued ticket and a change to the issued ticket, the comparing forming comparison data;

calculating, via a computer system, a residual value of the issued ticket based on a contract term associated with the issued ticket and any changes to the issued ticket or partial use of the issued ticket as indicated by the comparison data;

determining, via a computer system, an offer to redeem the issued ticket based on the residual value and a contract term associated with the issued ticket, the offer not including a refund; and presenting, via a computer system, the offer to redeem the issued ticket.

11. A computer-implemented system for facilitating automated redemption of an unused electronic ticket, comprising:

means for setting, via a computer, an aging period;

means for identifying, via a computer, a scheduled date of an issued ticket;

means for adding, via a computer, the aging period to the scheduled date and, if the scheduled date plus the aging period is earlier than a current date, determining whether all or a portion of the issued ticket is unused; and if all or a portion of the issued ticket has not been used, means for comparing information in an invoice table and a central reservation system database to determine at least one of a use of the issued ticket and a change to the issued ticket, the comparing forming comparison data;

means for calculating a residual value of the issued ticket based on a contract term associated with the issued ticket and any changes to the issued ticket or partial use of the issued ticket as indicated by the comparison data;

means for determining an offer to redeem the issued ticket based on the residual value and a contract term associated with the issued ticket, the offer not including a refund; and means for presenting the offer to redeem the issued ticket.

12. A computer-implemented system for facilitating timely use of an electronic ticket, comprising:

means for setting, via a computer, a reminder period;

means for identifying, via a computer, a scheduled date of an issued ticket; and means for subtracting, via computer a system, a reminder period from the scheduled date and, if the scheduled date minus the reminder period is earlier than a current date, determining whether all or a portion of the issued ticket is unused; and if all or a portion of the issued ticket has not been used, means for comparing information in an invoice table and a central reservation system database to determine at least one of a use of the issued ticket and a change to the issued ticket, the comparing forming comparison data;

means for calculating a residual value of the issued ticket based on a contract term associated with the issued ticket and any changes to the issued ticket or partial use of the issued ticket as indicated by the comparison data;

means for determining an offer to redeem the issued ticket based on the residual value and a contract term associated with the issued ticket, the offer not including a refund; and means for presenting the offer to redeem the issued ticket.

* * * * *